United States Patent

[11] 3,578,279

| | | |
|---|---|---|
| [72] | Inventor | Owen H. Scheldorf<br>Louisville, Ky. |
| [21] | Appl. No. | 856,536 |
| [22] | Filed | Sept. 10, 1969 |
| [45] | Patented | May 11, 1971 |
| [73] | Assignee | General Electric Company |

[54] RESILIENT MOUNTING MEANS
3 Claims, 4 Drawing Figs.

[52] U.S. Cl. ................................................. 248/20,
230/235, 248/24, 267/179
[51] Int. Cl. ................................................. F16f 15/00
[50] Field of Search .......................................... 248/20, 24,
15, 18, 21; 267/179; 230/235

[56] References Cited
UNITED STATES PATENTS

| | | | |
|---|---|---|---|
| 1,129,526 | 2/1915 | Sherwood ..................... | 248/24X |
| 1,290,159 | 1/1919 | Foster ........................... | 248/24 |
| 3,030,056 | 4/1962 | Rogers ......................... | 248/20 |
| 3,185,389 | 5/1965 | Loberg ......................... | 230/235 |

*Primary Examiner*—Roy D. Frazier
*Assistant Examiner*—J. Franklin Foss
*Attorneys*—Walter E. Rule, Harry F. Manbeck, Jr., Frank L. Neuhauser, Oscar B. Waddell and Joseph B. Forman ABSTRACT: Resilient mounting means comprising an open coil, helical spring and a spring-anchoring means comprising a stud of a smaller diameter than the spring and having a tapered end. The stud has a circumferential groove thereon which is square with the axis of the stud and the end of the spring which is anchored on the stud has an end turn portion which is also square with the spring axis and of a reduced diameter so that when slipped over the tapered end of the stud and positioned within the groove, it grips the stud through an angle of more than 180° to form the sole means for anchoring the spring on the stud. From this anchoring portion, the spring spirals tangentially outwardly from the groove and thereafter, within the first complete turn of the spring, extends helically to clear the tip of the spring end turn.

Patented May 11, 1971

3,578,279

INVENTOR.
OWEN H. SCHELDORF
BY Walter E. Rule
HIS ATTORNEY 3,578,279

RESILIENT MOUNTING MEANS

BACKGROUND OF THE INVENTION

Coil springs are employed in many types of resilient mounts used to support a load member on or relative to a base or supporting member. For example, many hermetic compressors employed in the refrigeration industry include three or more resilient mounting means comprising springs for supporting a motor compressor unit in the cup-shaped bottom half of the casing and spaced from the casing walls. To facilitate the assembly and positioning of each compressor unit within the casing component, it is essential that each of the elements of the mounting means be properly aligned relative to one another or more specifically that each helical coil spring be accurately aligned with respect to its anchoring or supporting means.

Another important requirement is that the mounting means be so constructed that it does not add to the normal operating noises of the compressor unit. A common cause of spring noise in a vibration mount is the intermittent touching or contacting of components or elements thereof which move relative to one another under the effect of the normal vibrations of the supported apparatus such as the compressor unit.

One type of aligned spring mount employed for resiliently supporting a hermetic compressor unit is shown in U.S. Pat. No. 3,030,056—Rogers, issued Apr. 17, 1962. In this mount, both ends of each spring are threadably received in spiral or threadlike grooves provided on or associated with both the compressor and the casing. To complete this assembly, the compressor and lower half of the casing must be so constructed and arranged as to provide access to the mounting areas after the compressor is positioned in the casing component in order to fasten threaded upper or load component to the compressor.

Another means for maintaining the spring in axial alignment with its support or anchor is disclosed in U.S. Pat. No. 3,185,389—Loberg, issued May 25, 1965. In the resilient mounting means disclosed in this patent, certain of the springs are provided with end turns of a smaller diameter than its operating coils or turns and these end turns are square with the axis of the spring to facilitate alignment of the spring and anchoring means. However, in the Loberg structure as in the Rogers structure the mounting means must be accessible to complete the assembly. More specifically the lower spring connection must be accessible to bolt the spring end fastener to the casing bracket.

The present invention has as its primary object the provision of an improved, low-cost resilient mounting means so constructed as to assure a positive axial alignment of the spring and its anchoring means.

Another object of the invention is to provide a low-cost, resilient mounting means including an open coil, helical spring which can be manufactured by use of the usual automatic spring-winding machinery and which does not require further processing subsequent to forming thereof.

A further object of the invention is to provide a vibration mount including the combination of an open coil helical spring and a mounting or anchoring means characterized by a fact that the spring can be easily anchored to its anchoring means.

SUMMARY OF THE INVENTION

In accordance with the illustrated embodiment of the present invention, there is provided a resilient mounting means which is particularly adapted for mounting a compressor within a hermetic casing. This mounting means comprises an open coil helical spring of cylindrical shape and a spring-anchoring means. The anchoring means comprises a stud of a smaller diameter than the coil spring and having a tapered end portion. The stud has a circumferential groove on the surface thereof adjacent the tapered end and square with the axis of the stud. The end of the spring secured to the stud comprises a coil turn portion which is of reduced diameter and which is square with the axis of the spring. This coil end turn portion is adapted to slip onto the tapered end and snap into and grip the groove in the stud through an angle of more than 180°. To accomplish this assembly and for noise control the end turn first spirals tangentially outward a distance greater than the depth of the groove in order to clear the adjacent surfaces of the stud and thereafter extends helically to clear the tip end of the spring end turn portion and assume the same helical pitch as the adjacent coils of the spring. By this construction, the only part of the spring engaging the anchor stud is that part of the end turn which is firmly gripping the groove.

DESCRIPTION OF THE PREFERRED EMBODIMENT

Figure 1:
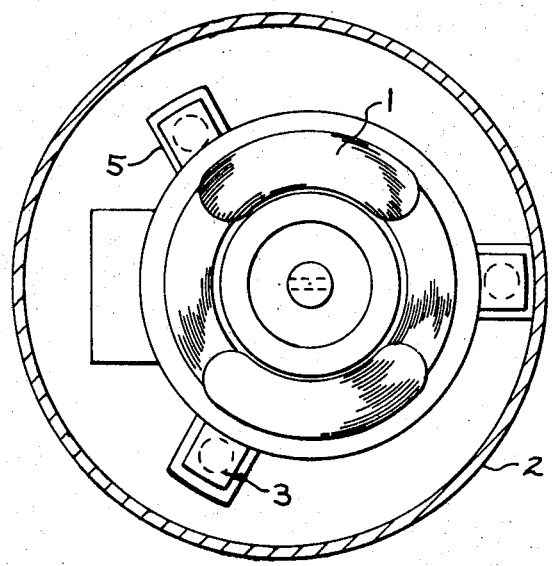
FIG. 1 is a plan view, in section, of a hermetic motor compressor unit embodying the resilient mount of the present invention.

Referring initially to FIG. 1 of the drawing, there is illustrated a hermetic motor-compressor unit comprising a motor-compressor component 1 vertically mounted within the lower part of a hermetic casing or housing 2. As the detailed construction of the motor-compressor unit forms no particular part of the present invention, its specific construction features are neither shown nor described in detail.

The motor-compressor unit 1 is resiliently supported within the lower half of casing 2 by means of a plurality of resilient mounts, specifically three such mounts, indicated generally by the numeral 3. In the illustrated embodiment of the invention, the three mounts are spaced equal distances about the axis of the motor-compressor unit and are designed to resiliently support the unit on the brackets 5 secured to the casing.

Figure 2:
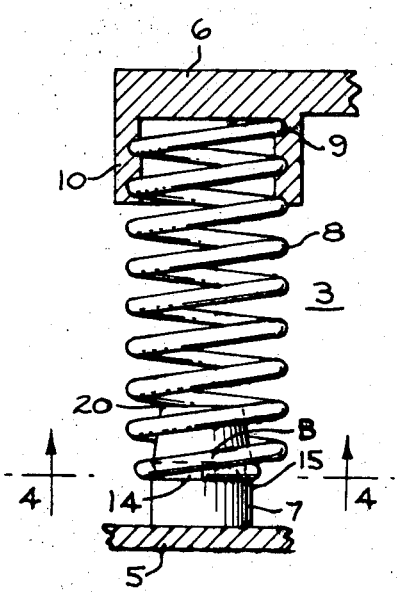
FIG. 2 is an elevational view illustrating certain details of construction of the resilient mount.

As best seen in FIG. 2 of the drawing, each vibration mount comprises a load member or motor-compressor flange 6 and a base member or anchoring means in the form of a stud 7 mounted on a bracket 5 with a cylindrical, open-coil, helical compression spring 8 positioned therebetween.

In the illustrated embodiment of the invention, the upper end 9 of the spring 8 is threaded into a collar 10 on a flange 6 and these collars vertically align each of the springs.

In accordance with the present invention, in each of the mounts the lower end of the spring component thereof is anchored onto a stud 7 extending vertically from a bracket 5.

Figure 4:
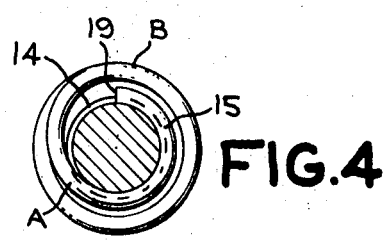
FIG. 4 is a sectional view taken along line 4—4 of FIG. 2.
Figure 3:
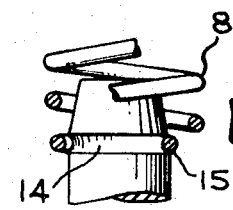
FIG. 3 is a view of part of the mount shown in FIG. 2 with certain portions of the spring cut away.

More specifically, the stud 7 as shown in FIGS. 2, 3 and 4, is provided with a circumferential groove 14 in a plane which is square or perpendicular to the axis of the stud 7. This groove 14 forming the sole means for anchoring the spring 8 to the stud is designed to receive an extreme end portion 15 on the lower end turn of the spring. This end portion, having the same circular cross section as the remaining wire of the coil, is formed square with the longitudinal axis of the spring 8 and is of a diameter less than the free or operating coils of the spring so that when it is slipped onto the stud and snapped into the groove 14, it will firmly grip the groove portion of the stud 7 to firmly anchor the spring on the stud. Since the gripping portion 15 of the spring is square with the axis of the spring and the groove is square with the axis of the stud 7, this gripping engagement of the spring end turn portion with the stud axially aligns the spring with the stud.

The end portion 15 has a circumferential length of more than 180° in order that it will firmly grip and anchor the spring onto the stud. Preferably, to avoid displacement of the spring from the stud, the angular length of the squared end turn portion 15 encompassing the stud is in the neighborhood of about 225°. This length also provides for the further shaping of the complete spring end turn so as to prevent any interference or intermittent contact of the resilient mount components during supporting operation thereof.

More specifically, the spring wire forming the end turn begins to spiral outwardly and tangentially from the groove 14 at approximately point A on FIG. 4 of the drawing to a radius slightly larger than the radius of the adjacent surface of the stud 7, that is the surface adjacent the groove 14. Thereafter, the end turn gradually assumes the helical pitch of the adjacent or remaining turns of the coil 8 while continuing to increase in diameter. By this configuration, the point B on the spring, which is about 360° from the tip 19 of the spring, is offset laterally and radially from the tip 19 of the spring a distance sufficient to clear the spring tip end 19 both in the as-formed shape of the spring as well as in its shape when mounted on stud 7 and supporting the load represented by the compressor.

Preferably, the upper end 20 of the stud 7 and at least that portion thereof above the groove 15 is tapered to facilitate assembly on the end turn portion 15 of the spring onto the stud and into the groove 14. Also, if the upper end 20 is of sufficient length, it will serve as a stop means for limiting horizontal or rotational movement of the compressor within the casing 2 by engagement of the upper end of the stud 7 with the adjacent portions of the spring 8.

From the above description, it will be seen that, unlike the prior-art spring mounts referred to hereinbefore, the mount of the present invention involves a spring-to-anchor attachment which is completed merely by sliding a spring end turn onto a tapered stud and forcing the end turn into an anchoring groove. This connection is of low cost and does not require sufficient access to the mounts after positioning of the compressor component in the case to secure the mount to the load or base component by bolts or the like. Also since all three springs are aligned with one another as well as their respective anchoring studs, all spring ends can be readily slid onto their respective studs during positioning of the compressor unit in the casing component.

Preferably the reduced diameter squared end turn portion 15 is of a diameter concentric with and smaller than the remaining turn or at least the first adjacent turn of the coil by approximately two wire sizes or diameters. This provides a smooth transition from the gripping end turn portion 15 to the operating coils of the spring while at the same time providing increased rigidity of the portions of the spring closest to the stud.

While there has been shown and described a specific embodiment of the present invention, it will be understood that it is not limited thereto and it is intended by the appended claims to cover all such modifications as fall within the true spirit and scope of the invention.

I claim:

1. Resilient mounting means for mounting a compressor or the like comprising in combination:

a load-supporting member and a base member;

an open, helically coiled, round wire spring having the ends thereof secured to said members;

the means for securing said spring to at least one of said members comprising a cylindrical stud including a tapered end having a circumferential groove thereon square with the axis of said stud;

the end of said spring secured to and supported on said stud comprising in its as-formed shape an end turn having a first portion of reduced diameter and square with the axis of said spring and adapted to be slipped onto the tapered end of said stud and positioned within and gripping said groove through an angle of more than 180°, the remaining portion of said end turn spiralling tangentially outwardly from said groove to a radius sufficient to clear the adjacent surface of said stud and the tip of said end turn and also assuming the helical pitch of the adjacent turns of said spring whereby the final portion of said end turn is radially and laterally offset from said tip;

said spring engaging said stud only within said groove during normal operation of said compressor.

2. The mounting means of claim 1 in which said first end turn portion is of a diameter about two wire diameters less than the diameter of adjacent unsupported turns of said spring.

3. The mounting means of claim 1 in which said first end turn portion grips said stud through an angle of about 225°.